United States Patent
Oswald

(10) Patent No.: US 11,332,172 B2
(45) Date of Patent: May 17, 2022

(54) METHOD OF WHEEL CALIBRATION

(71) Applicant: Westinghouse Air Brake Technologies Corporation, Wilmerding, PA (US)

(72) Inventor: James A. Oswald, Coggon, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 717 days.

(21) Appl. No.: 16/155,050

(22) Filed: Oct. 9, 2018

(65) Prior Publication Data
US 2020/0108847 A1 Apr. 9, 2020

(51) Int. Cl.
*B61K 9/12* (2006.01)
*B61L 25/02* (2006.01)
*G01B 11/10* (2006.01)
*G01B 7/293* (2006.01)
*G01B 7/14* (2006.01)
*G01B 7/12* (2006.01)
*G01B 11/255* (2006.01)

(52) U.S. Cl.
CPC .............. *B61K 9/12* (2013.01); *B61L 25/025* (2013.01); *G01B 7/125* (2013.01); *G01B 7/14* (2013.01); *G01B 7/293* (2013.01); *G01B 11/105* (2013.01); *G01B 11/255* (2013.01)

(58) Field of Classification Search
CPC .... B61L 25/025; B61L 25/026; B61L 23/041; B61K 9/12; G01B 7/125; G01B 7/14; G01B 7/293; G01B 11/105; G01B 11/255; G01B 21/12
See application file for complete search history.

(56) References Cited

U.S. PATENT DOCUMENTS

| 2011/0091077 | A1* | 4/2011 | Puchert | B61L 25/025 382/106 |
| 2013/0060520 | A1* | 3/2013 | Amor | G01C 15/008 702/154 |
| 2014/0176711 | A1* | 6/2014 | Kirchner | G01S 19/50 348/148 |
| 2014/0247356 | A1* | 9/2014 | Forni | B61L 23/041 348/148 |
| 2015/0008294 | A1* | 1/2015 | Desbordes | G06T 7/20 246/122 R |
| 2015/0134155 | A1* | 5/2015 | Kanner | B61L 25/023 701/19 |

(Continued)

*Primary Examiner* — Zachary L Kuhfuss
(74) *Attorney, Agent, or Firm* — The Small Patent Law Group LLC; Josef L. Hoffmann

(57) ABSTRACT

In a method of determining a radius or diameter of a train wheel, a camera mounted on a train acquires first and second images (pictures) of first and second objects spaced along a path being traveled by the train. Matches are then determined between the first and second objects appearing in the first and second acquired images and representations (pictures) of the first and second objects appearing in prerecorded images included in a track database that include corresponding first and second geographical locations. A distance L traveled by the train between the first and second geographical locations is determined and a sum C of electrical pulses generated by an encoder coupled to the train wheel during travel of the train the distance L is determined. Based on the distance L and the sum C, a diameter or radius of the wheel is determined.

20 Claims, 9 Drawing Sheets

(56) References Cited

U.S. PATENT DOCUMENTS

| | | | |
|---|---|---|---|
| 2015/0239482 A1* | 8/2015 | Green | B61L 23/041 246/122 R |
| 2017/0305396 A1* | 10/2017 | Shiratsuchi | B61L 25/026 |
| 2018/0037242 A1* | 2/2018 | Haedicke | B61L 25/025 |
| 2020/0160549 A1* | 5/2020 | Oswald | G06F 16/532 |
| 2021/0094595 A1* | 4/2021 | Kalberer | B61L 25/026 |

* cited by examiner

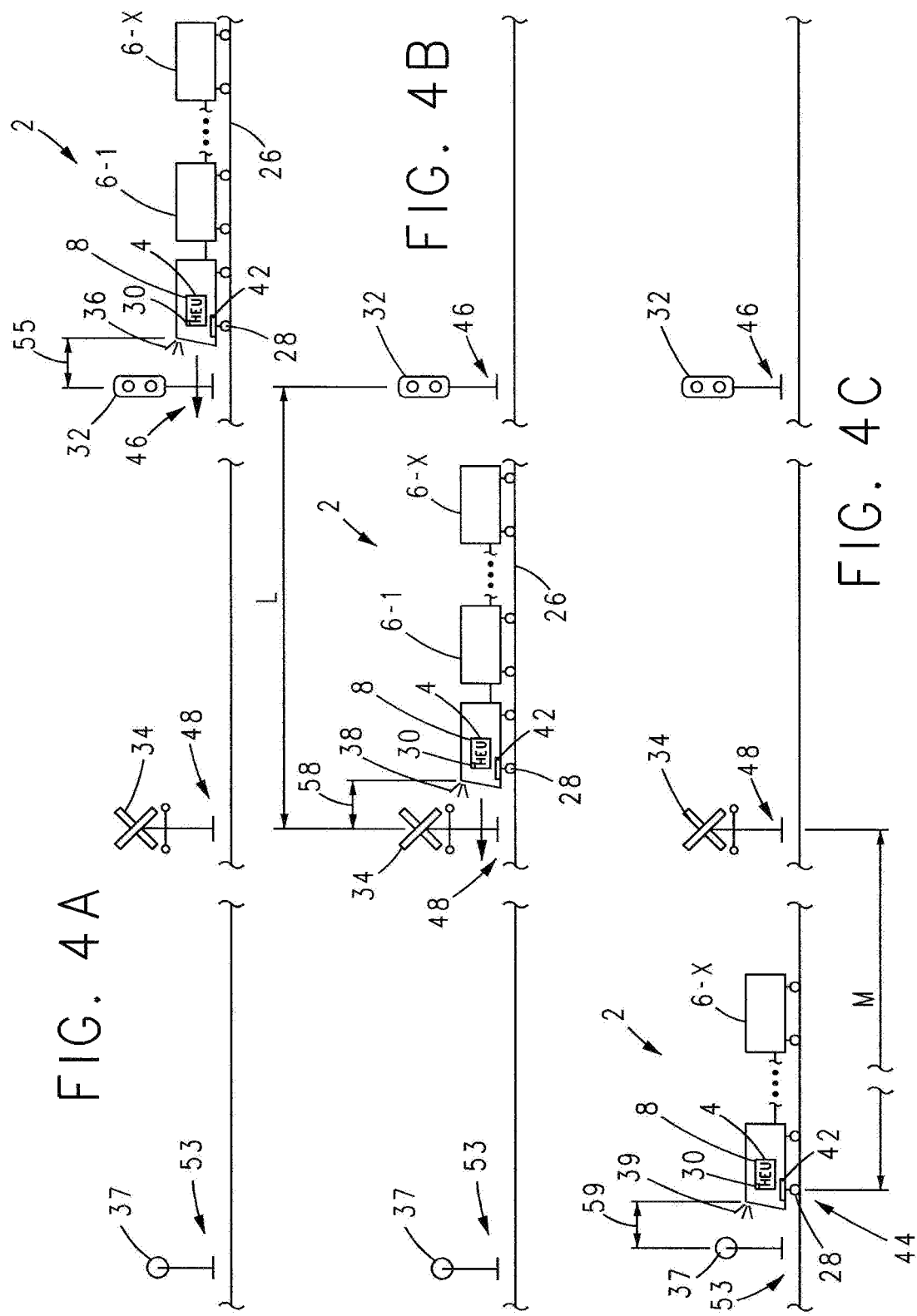

METHOD OF WHEEL CALIBRATION

BACKGROUND OF THE INVENTION

Field of the Invention

The present invention relates to calibration of a train wheel and, more particularly, to determining a size, e.g., diameter, radius, or both, of the train wheel.

Description of Related Art

Trains equipped with positive train control (PTC) rely on accurate position and speed information in order to properly enforce speed restrictions and movement limitations. In an example, a train equipped with a PTC can determine its location from GPS data. Unfortunately, there are locations and situations where GPS signals are not available or are intermittently available, such as tunnels, mountains, and urban canyons. Additionally, GPS data can be invalid due to multipath conditions or other detected signal errors. During those periods when GPS signals are not available or are invalid, PTC uses dead-reckoning to determine and track the location of the train. In a train environment, dead-reckoning is a process of determining the train's current position by using a previously determined position, or fix, and advancing that position based upon known or estimated speeds over elapsed time, course and heading.

When using dead-reckoning, PTC can be vulnerable to position error due to not knowing the true diameter (or radius) of a train wheel that is used with an encoder coupled to the train wheel to determine rotations of the train wheel and, therefrom, a linear distance traveled by the train wheel and, hence, the train itself. Errors in the wheel diameter (or radius) can accumulate during times when dead-reckoning is being used by PTC resulting in the position of the train determined by PTC being less and less accurate over time and/or distance traveled while using dead-reckoning. This condition has been observed with PTC systems operating in service as the train exits from a long tunnel. The difference in real train position and the dead-reckoned position can result in false enforcement as the train is enforced for a stop signal that the train had already passed, i.e., the train already passed the stop signal but PTC position indicated it was still ahead.

The present PTC wheel diameter calibration process is limited by uncertainty in GPS data. For example, where differential correction of GPS data is unavailable, GPS position uncertainty may not be reliable, e.g., at best around 3 meters. Moreover, current calibration algorithms require the train to travel long distances (several kilometers) in order to compute a wheel diameter and overcome any GPS position uncertainty. Calibration is often aborted because GPS becomes unavailable during travel of the train during calibration or is aborted due to a detected wheel slip/slide event. Because the distance is so long, these events are likely. Even when a GPS calibration is successfully completed, it can still contain some uncertainty.

SUMMARY OF THE INVENTION

Generally, provided is a method for determining a size, e.g., radius, diameter, or both, of train wheel.

According to one preferred and non-limiting embodiment, reliance on GPS for wheel calibration is reduced or eliminated by making use of a cab camera, a controller running an image distance measurement technique (machine vision), and a track database to calibrate wheel diameter, thus avoiding error that can occur during dead-reckoning.

In one preferred and non-limiting embodiment or example, a train mounted, e.g., front facing, camera can acquire a first image of a first object, such as, without limitation, a signal mast or switchpoint, and a controller, programmed or configured with an image distance measurement technique, can process the first image of the first object using the image distance measurement technique to compute a first distance from the camera, in particular a lens of the camera, to the first object the moment the first image was acquired. Image distance measurement techniques are known in the art which will not be described further herein.

In one preferred and non-limiting embodiment or example, the geographical location (e.g. longitude and latitude) of the first object can then be determined from the track database accessible to the controller. In an example, the track database can include stored images of a number of objects, including a stored image of the first object, on or proximate at least the track or path the train is travelling. In an example, each image of an object stored in the track database can include or can have associated therewith a geotagged geographical location (e.g. longitude and latitude) of an actual (physical instance of the) object on or proximate the track.

In one preferred and non-limiting embodiment or example, the controller compares the acquired first image of the first object to one or more images stored in the track database for a match. Upon determining a match between the first image of the first object acquired by the camera and an image of the first object stored in the track database, the controller can associate, assign, or link to the first object the geotagged geographical location included with or associated with said stored image, whereupon this geotagged geographical location can be considered the geographical location of the first object. In an example, the geographical location of the first object determined in this manner can be accurate within about one-third of a meter or less.

In one preferred and non-limiting embodiment or example, based on the geographical location thus associated with the first object and the first distance from the camera to the first object determined via the image distance measurement technique, the controller can determine a first geographical location of the camera and, hence, the train, the moment the camera acquired the first image of the first object.

In one preferred and non-limiting embodiment or example, in addition to determining the first geographical location of the camera and, hence, the train, the moment the camera acquired the first image of the first object in the manner described above, the geographic location of the train determined prior to the moment the camera acquired the first image of the first object can optionally be used by the controller, as needed, to resolve or correct for any potential ambiguity in determining the first geographical location of the camera (or train) the moment the camera acquired the first image of the first object. In an example, this potential ambiguity can arise from uncertainty as to which side of the object the camera is positioned the moment the camera acquired the first image of the first object. By knowing this optional prior geographical location, the controller can be programmed or configured to determine the direction that the train is approaching the first object and, hence, the side of the first object the train is positioned the moment the camera acquired the first image of the first object.

In an example, suppose the train is heading west approaching the first object from the east. Prior to the camera acquiring the first image of the first object, the controller determines the optional prior geographical location further to the east of the camera's current position. Knowing this prior geographical location and the geographical location of the first object itself, determined in the manner described above based on the first image of the first object acquired by the camera, the controller can be programmed or configured to determine that the camera (or train) is east (versus west) of the first object the moment the camera acquired the first image of the first object. In this example, knowing that the camera (or train) is east of the first object, the controller can adjust, as necessary, the geographical location of the camera (or train) determined in the manner described above the moment the camera acquired the first image of the first object. In this manner, the controller is able to better resolve any potential ambiguity in determining the geographical location of the camera (or train).

In an example, this prior geographical location can be determined from a geographic location determined in the manner described above for an image of another object acquired by the camera before acquiring the first image of the first object. In another example, this prior geographical location can be determined by the controller from an output of a position determining means. In an example, the position determining means can be a GPS receiver which can determine the prior geographical location of the camera (or train) from GPS satellite signals received at a time when said GPS satellite signals are available. In another example, the position determining means can be an inertial navigation system, such as a gyroscope. In another example, the position determining means can be a compass or a magnetometer.

In one preferred and non-limiting embodiment or example, as the train travels further down the track after the camera acquires the first image of the first object, the camera can acquire a second image of a second object and the controller can process the second image of the second object using the image distance measurement technique to compute a second distance from the camera to the second object the moment the second image was acquired.

In one preferred and non-limiting embodiment or example, the geographical location of the second object can be determined from the track database in the manner described above for determining the geographical location of the first object. For example, the track database can include a stored image (representation) of the second object that includes or has associated therewith a geotagged geographical location of the actual (physical instance of the) second object. In one preferred and non-limiting embodiment or example, the controller compares the acquired second image of the second object to one or more images stored in the track database for a match. Upon the controller determining a match between the acquired second image of the second object and the image of the second object stored in the track database, the controller can associate with the second object the geotagged geographical location included or associated with the stored image of the second object, whereupon this geotagged geographical location can be considered the geographical location of the actual second object itself. In an example, the geographical location of the actual second object itself determined in this manner can be accurate within about one-third of a meter or less.

In one preferred and non-limiting embodiment or example, based on the geographical location thus associated with the second object and the second distance from the camera to the actual second object determined by the controller via the image distance measurement technique, the controller can determine a second geographical location of the camera and, hence, the train, the moment the camera acquired the second image of the second object.

In one preferred and non-limiting embodiment or example, in addition to determining the second geographical location of the camera and, hence, the train, the moment the camera acquired the second image of the second object in the manner described above, the geographic location of the train determined prior to the moment the camera acquired the second image of the second object can optionally, as needed, be used by the controller in the manner described above to resolve or correct for any potential ambiguity in determining the second geographical location of the camera (or train) the moment the camera acquired the second image.

In one preferred and non-limiting embodiment or example, the track database can include or have access to a distance database that can include data or information from which distances between pairs of objects represented by (included in) images stored in the track database can be determined. In one preferred and non-limiting embodiment or example, once the controller has determined the first and second geographical locations of the camera in the manner described above, the controller can obtain or determined from the data or information included in the distance database a distance (L) between said first and second geographical locations of the camera.

In one preferred and non-limiting embodiment or example, during travel of the train between the first and second geographical locations of the camera determined in the manner described above, the controller can monitor the output of an encoder coupled to a wheel of the train. In an example, the encoder can be configured to output a known number (X) of electrical pulses per revolution of the wheel. In an example, based on a sum (C) of electrical pulses output by the encoder and counted by the controller during travel of the train the distance L between the first and second geographical locations of the camera determined in the manner described above, the controller can determine a total number of revolutions of the wheel between said first and second geographical locations of the camera.

In an example, based on the distance L obtained or determined from the distance database, the sum C of electrical pulses counted by the controller during travel of the train between the first and second geographical locations of the camera, and the number X of electrical pulses output by the encoder per revolution of the wheel, a radius (R) or diameter (D) of the train wheel can be determined by the controller.

In one preferred and non-limiting embodiment or example, the radius R of the wheel can be determined using the formula: $R=(L)(X)/2(\pi)(C)$. In one preferred and non-limiting embodiment or example, the diameter D of the wheel can be determined using the formula: $D=(L)(X)/(C)(\pi)$. However, the use of one or both of these formulas is not to be construed in a limiting sense.

In one preferred and non-limiting embodiment or example, determining the wheel radius or diameter in this manner avoids uncertainty in determining wheel radius or diameter based on uncertainties in GPS data acquired at first and second geographical locations.

In one preferred and non-limiting embodiment or example, determining the wheel radius or diameter in this manner can be performed quickly and as needed. Any two objects along the path of the train for which corresponding objects are including in images stored in the track database can be used. Closer spaced objects can avoid the chance of wheel slip or slide from affecting the determination of wheel radius or diameter in this manner. Longer spaced objects can help avoid uncertainty in the image distance measurement technique (machine vision) used to determine a distance from the camera to an object. In an example, by determining the wheel radius or diameter in this manner continuously, periodically, or aperiodically, errors in the wheel radius or diameter being used for PTC can be detected and updated with a new wheel radius or diameter determined in the manner described above.

In an example, it is envisioned that determining the wheel radius or diameter in this manner can be more reliable than using GPS. Multipath or GPS outages can be avoided.

With an accurately calibrated wheel radius or diameter, it is envisioned that PTC can dead-reckon for longer distances with improved accuracy. This, in-turn, can improve the safety of PTC allowing it to more accurately know its location to prevent target overrun. Additionally, since wheel diameter is also used to compute current speed, PTC becomes safer with a more accurate speed determination allowing PTC to prevent over-speed operation. More accurate speed can also improve the accuracy of computed braking distances since speed is a major influence of those calculations.

In one preferred and non-limiting embodiment or example, once the radius or diameter of the train wheel has been determined, the controller can use this radius or diameter for determining a distance the train travels. In an example, the controller can determine a number of whole or partial revolutions of the wheel during travel of the train along the track from a count of the electrical pulses output by the encoder. Based on this count and the radius or diameter of the wheel determined in the manner described above, the controller can determine a distance (M) the train has traveled along the track and, hence, a geographical location of the train using dead-reckoning.

In one preferred and non-limiting embodiment or example, once the train has traveled the distance M, the camera can acquire a third image of a third object. The controller can then search the track database for a match between the third image of the third object acquired by the camera and an image of the third object stored in the track database that includes or has associated therewith a geotagged geographical location of the actual (physical instance of the) third object. Upon determining a match between the third image of the third object acquired by the camera and an image of the third object stored in the track database, the controller can associate, assign. or link to the third object the geotagged geographical location included with or associated with said stored image, whereupon this geotagged geographical location can be considered the third geographical location of the third object. In an example, the third geographical location of the third object determined in this manner can be accurate within about one-third of a meter or less.

In an example, the controller can, using the image distance measurement technique, determine from the third image of the third object acquired by the camera a third distance from the camera (or train) to the third object the moment the camera acquired the third image. The controller can, in the manner described above, determine the geographical location of the camera (or train) from the third geographical location of the third object and the third distance from the camera to the third object, and can compare this thus determined geographical location of the train to the geographical location of the train determined using dead-reckoning as a check that the geographical location of the train determined using dead-reckoning is accurate within a desired tolerance. If the geographical location of the train determined using dead-reckoning is NOT accurate within the desired tolerance, the controller can be programmed or configured to take this as an indication that the wheel radius or diameter being used for dead-reckoning calculations not accurate whereupon the controller can subsequently determine the wheel radius or diameter from camera acquired images of at least two objects and images of objects stored in the track database in the manner described above.

In an example, this can give PTC another means to correct dead-reckoning when GPS is unavailable or unusable. This can be useful for example in a tunnel. If one or more objects (e.g., intermediate signal, exhaust fan head, structural bracing, etc.) are identified in the track database inside a tunnel, this technique can allow the controller to make navigation corrections within the tunnel. This can improve PTC position accuracy and allow PTC to exit a tunnel and properly enforce speed restrictions and movement limitations near that exit. When GPS is available, this technique can be used as another means to determine position accuracy and may be able to reduce or eliminate any position errors due to lag in the GPS data.

Further preferred and non-limiting embodiments are set forth in the following numbered clauses.

Clause 1: A method comprising: (a) acquiring, by at least one camera mounted on a train, first and second images of first and second objects on or proximate a path being traveled by the train, wherein the first and second objects are spaced along the path of the train; (b) determining, by a controller comprising one or more processors, a match between the first object in the first image and a first object representation included in a track database that includes a first geographical location; (c) determining, by the controller, a match between the second object in the second image and a second object representation included in the track database that includes a second geographical location; (d) determining, by the controller, a distance (L) traveled by the train along the path between at least the first geographical location and the second geographical location; (e) determining, by the controller, a sum (C) of electrical pulses generated by an encoder during travel of the train the distance L, wherein the encoder is operative to generate X electrical pulse(s) per revolution of the wheel; and (f) determining, by the controller, based on the distance L determined in step (d) and the sum C determined in step (e), a diameter (D) or radius (R) of the wheel.

Clause 2: The method of clause 1, wherein each geographical location can comprise a longitude and a latitude of said geographical location.

Clause 3: The method of clause 1 or 2, wherein the radius (R) of the wheel can be determined using the formula: $R=(L)(X)/2(\pi)(C)$ Clause 4: The method of any one of clauses 1-3, wherein the diameter (D) of the wheel can be determined using the formula: $D=(L)(X)/(C)(\pi)$ Clause 5: The method of any one of clauses 1-4, further including, following step (f): (g) determining, by the controller, a number of whole or partial revolutions of the wheel during travel of the train along the path; and (h) determining, by the controller, a distance (M) the train has traveled along the path based on the number of whole or partial revolutions of the wheel determined in step (g) and the radius or diameter of the wheel determined in step (f).

Clause 6: The method of any one of clauses 1-5, wherein, in step (g), the number of whole or partial revolutions of the wheel can be determined, by the controller, from a sum of the electrical pulses generated by the encoder.

Clause 7: The method of any one of clauses 1-6, further including determining, by the controller, a velocity of the train based on the distance M determined in step (h) divided by a time for the train to travel the distance M.

Clause 8: The method of any one of clauses 1-7, further including, following step (f): (g) determining, by the controller, a distance (M) the train has traveled based on a count of the number of electrical pulses generated by the encoder during said travel.

Clause 9: The method of any one of clauses 1-8, wherein step (a) includes determining, by the controller, a velocity of the train based on the distance M determined in step (g) divided by a time for the train to travel the distance M.

Clause 10: The method of any one of clauses 1-9, further including, following step (f): (g) determining, by the controller, a velocity of the train based on a number of whole or partial revolutions of the wheel between a pair of geographical locations and a time for the train to travel between said pair of geographical locations.

Clause 11: The method of any one of clauses 1-10, further including determining, by the controller, at least one of the following: a first distance from the camera to the first object; or a second distance from the camera to the second object; or both.

Clause 12: The method of any one of clauses 1-11, wherein, in step (d), the distance L can be determined based on least one of the following: the first distance; or the second distance; or both.

Clause 13: The method of any one of clauses 1-12, further including determining, by the controller, a first distance from the camera to the first geographical location, and a second distance from the camera to the second geographical location, wherein, in step (d), the distance L can be determined based on a difference between the first distance and the second distance.

Clause 14: The method of any one of clauses 1-13, further including, following step (h): (i) determining, by the controller, when the train has traveled the distance M along the path, a geographical location of the train; (j) acquiring, by the camera, a third image of a third object on or proximate a path being traveled by the train; (k) determining, by the controller, a match between the third object in the third image and a third object representation included in the track database that includes a third geographical location; (l) determining, by the controller, a third distance from the camera to the third object; and (m) determining, by the controller, based on the geographical location determined in step (i), the third geographical location determined in step (k), and the third distance determined in step (l), a geographical location of the train.

Clause 15: The method of any one of clauses 1-14, further including providing to the controller access to a model of the path that includes geographical locations corresponding to physical locations along the path, wherein step (i) includes the controller: (1) tracking via the model geographical locations of the train corresponding to the physical locations encountered by the train during travel of the train along the path determined from the whole or partial revolutions of the wheel during travel of the train on the path; and (2) acquiring via the model the geographical location of each physical location encountered by the train during travel of the train on the path, including the geographical location of the train in step (i).

Clause 16: The method of any one of clauses 1-15, wherein the camera can be mounted on a lead vehicle of the train.

Clause 17: The method of any one of clauses 1-16, wherein the camera can be mounted on a locomotive of the train.

Clause 18: The method of any one of clauses 1-17, wherein the distance L can be determined at least in-part from distance data included in the track database.

Clause 19: A computer-implemented method comprising: (a) receiving, by a controller, comprising one or more processors, from by at least one camera mounted on a train, first and second images of first and second objects on or proximate a path being traveled by the train, wherein the first and second objects are spaced along the path of the train; (b) determining, by the controller, a match between the first object in the first image and a first object representation included in a track database that includes a first geographical location; (c) determining, by the controller, a match between the second object in the second image and a second object representation included in the track database that includes a second geographical location; (d) determining, by the controller, a distance (L) traveled by the train along the path between at least the first geographical location and the second geographical location; (e) determining, by the controller, a sum (C) of electrical pulses generated by an encoder during travel of the train the distance L, wherein the encoder is operative to generate X electrical pulse(s) per revolution of the wheel; and (f) determining, by the controller, based on the distance L determined in step (d) and the sum C determined in step (e), a diameter (D) or radius (R) of the wheel.

Clause 20: The method of clause 19, further including, following step (f): (g) determining, by the controller, a number of whole or partial revolutions of the wheel during travel of the train along the path; and (h) determining, by the controller, a distance (M) the train has traveled along the path based on the number of whole or partial revolutions of the wheel determined in step (g) and the radius or diameter of the wheel determined in step (f).

Clause 21: The method of clause 19 or 20, further including determining, by the controller, at least one of the following: a first distance from the camera to the first object; or a second distance from the camera to the second object; or both.

Clause 22. The method of any one of clauses 19-21, wherein, in step (d), the distance L can be determined based on least one of the following: the first distance; or the second distance; or both.

BRIEF DESCRIPTION OF THE DRAWING(S)

Figure 1:
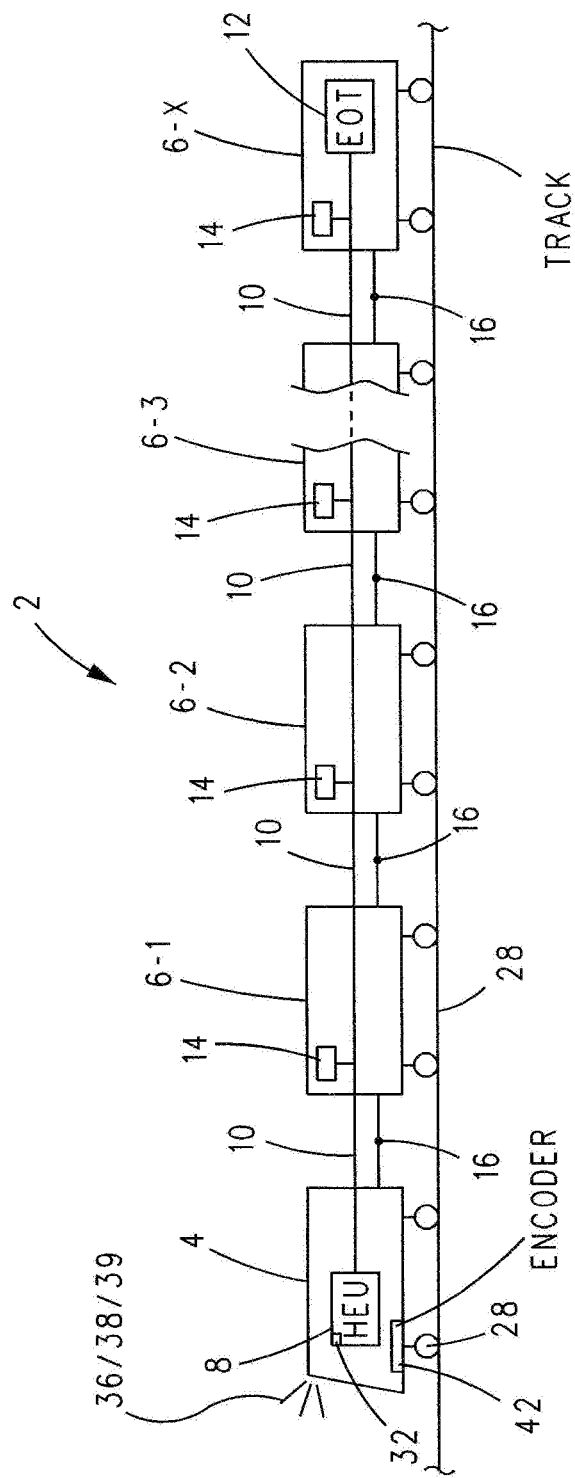
FIG. 1 is a schematic illustration of a train on a path or track in accordance with the principles of the present invention.
Figure 5A:
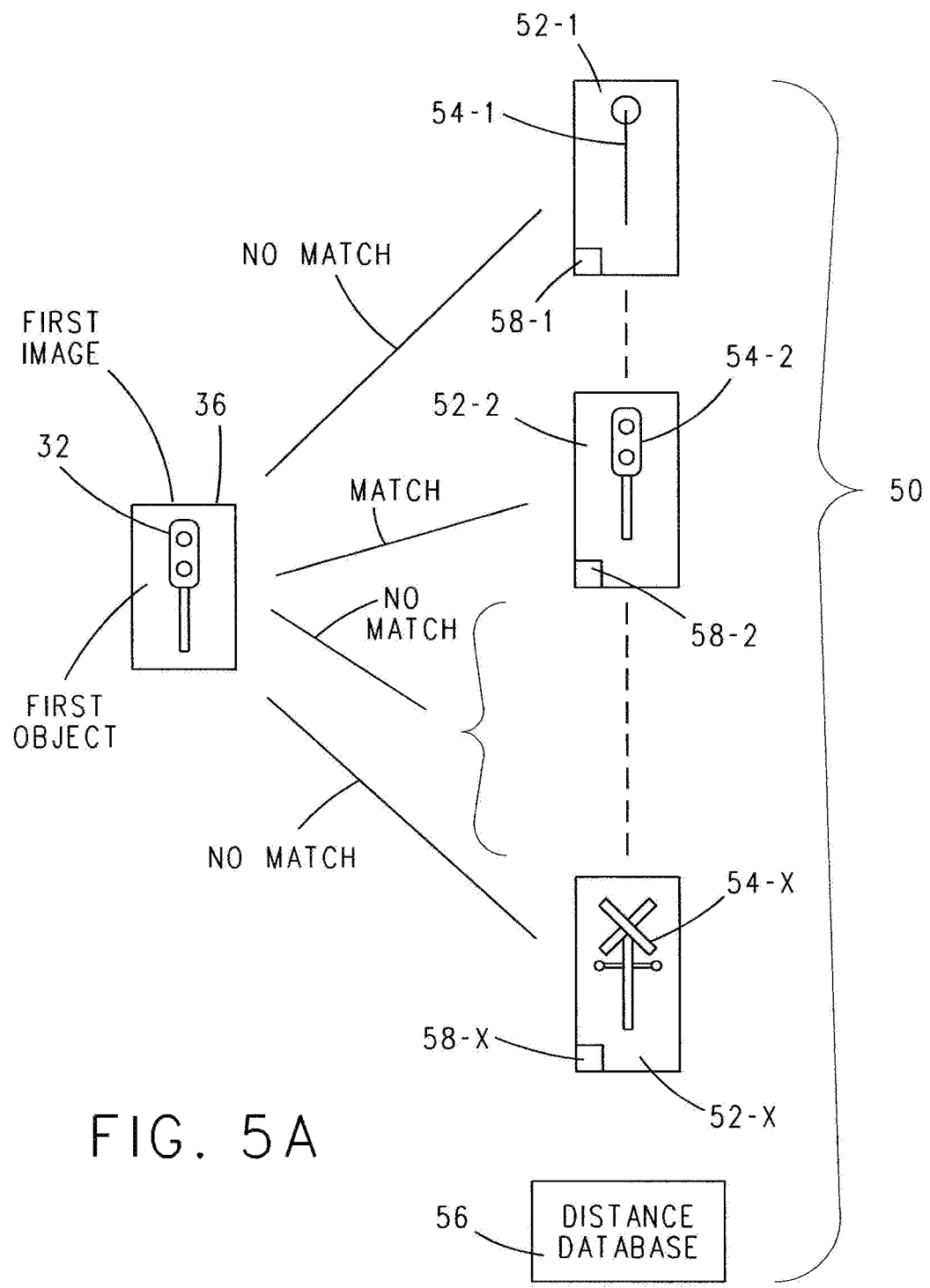
Figure 5B:
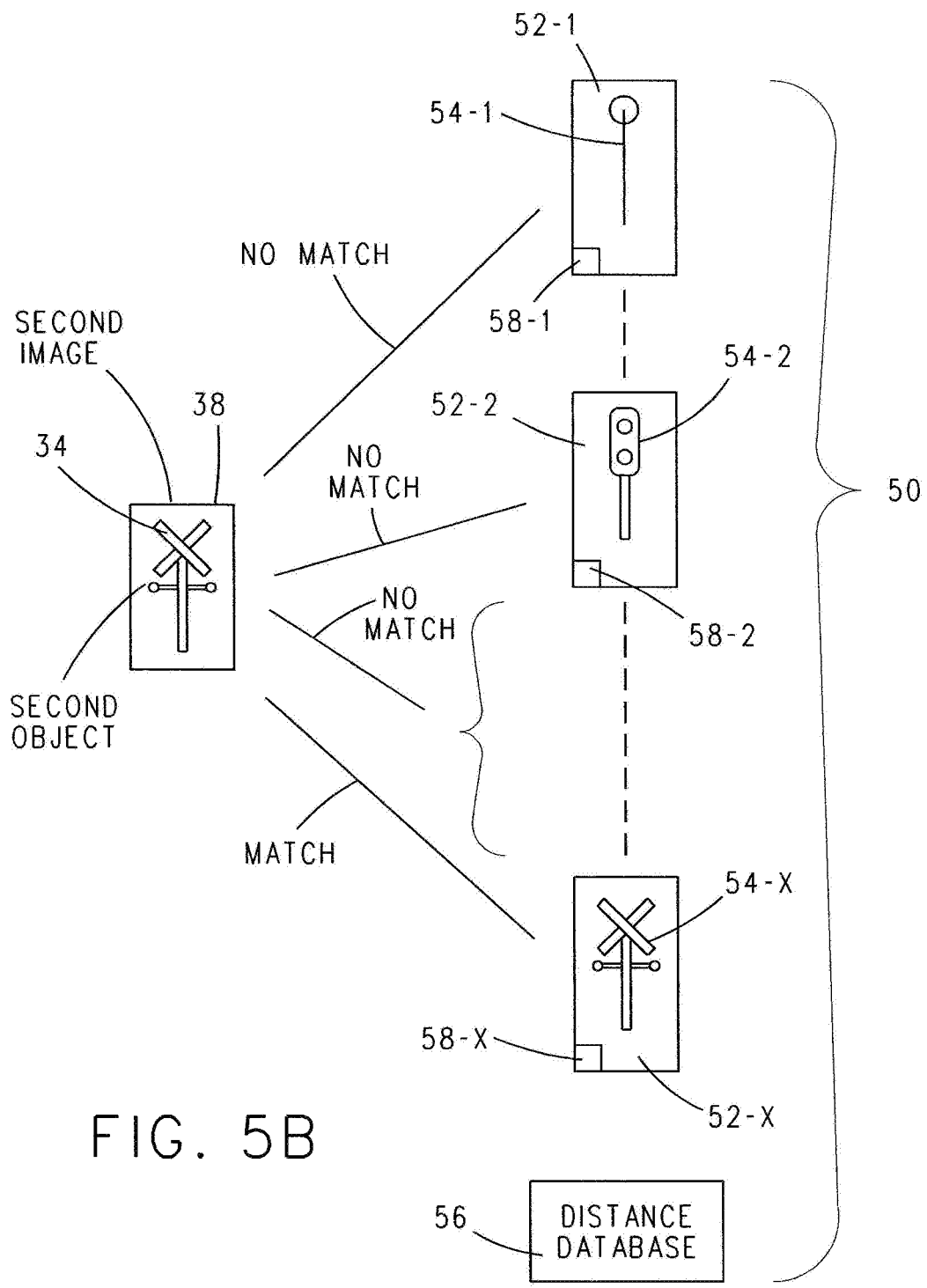
Figure 5C:
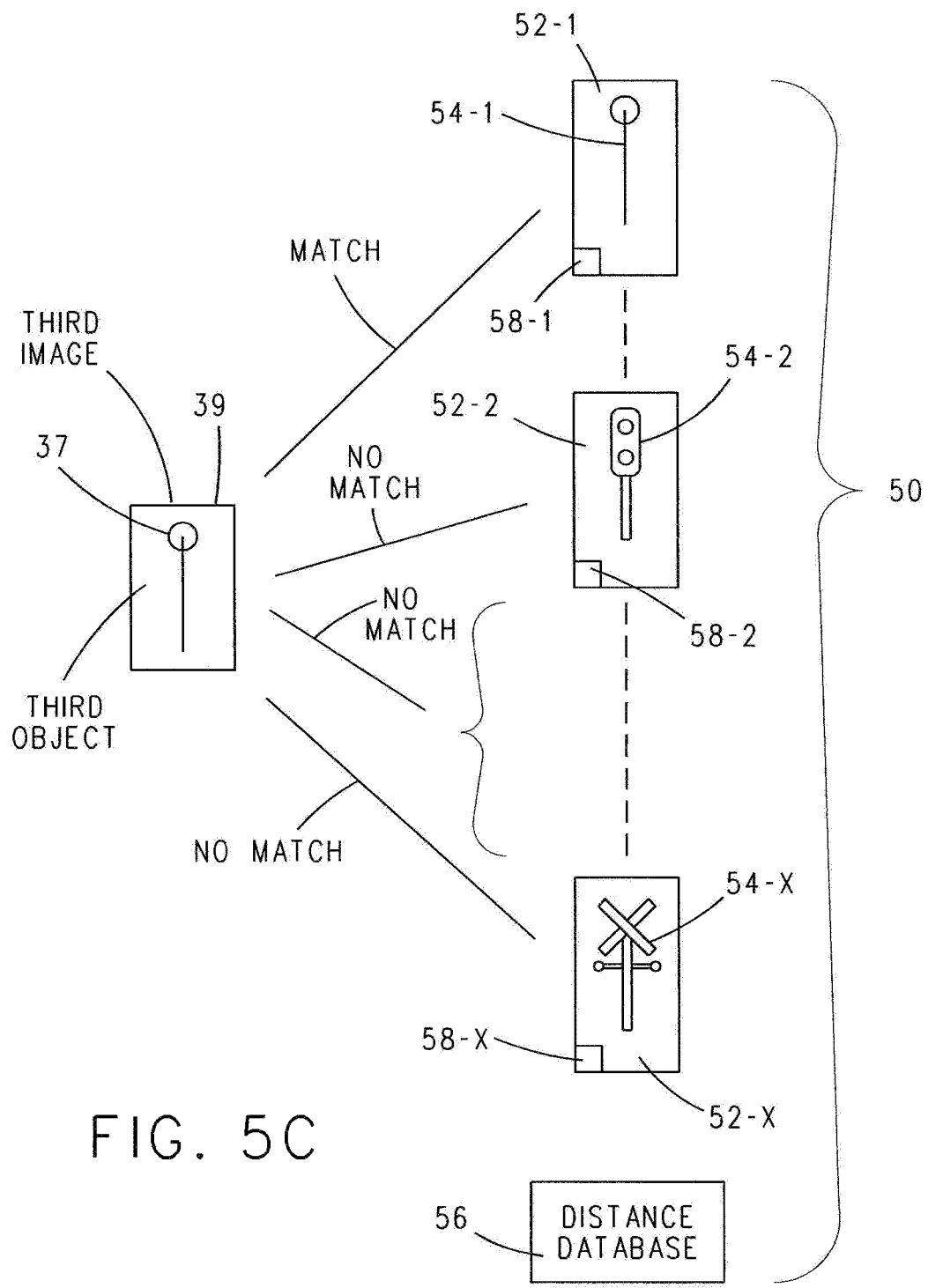

FIGS. 4A-4C are schematic illustrations of the train of FIG. 1 moving along the path or track while acquiring images of objects on or along the path or track in accordance with the principles of the present invention; and FIGS. 5A-5C are illustrations of searches of object appearing in images stored in a track database for matches with objects appearing in images acquired by a camera mounted on the train of FIG. 1 in accordance with the principles of the present invention.

DESCRIPTION OF THE INVENTION

Various non-limiting examples will now be described with reference to the accompanying figures where like reference numbers correspond to like or functionally equivalent elements.

For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the invention. Hence, the specific examples or aspects disclosed herein are not to be construed as limiting.

With reference to FIG. 1, in one preferred non-limiting embodiment or example, a train 2 can include a locomotive 4 and, optionally a number of cars 6-1-6-X, where "X" can be any whole number greater than or equal to 2. In the example train 2 shown in FIG. 1, locomotive 4 is the lead vehicle of the train and car 6-X is the last vehicle of train 2. However, this is not to be construed in a limiting sense since it is envisioned that the lead vehicle of train 2 can be a car 6 other than locomotive 4, e.g., locomotive 4 can be positioned in train 2 between the lead vehicle and the last vehicle. For the purpose of the following description, locomotive 4 will be considered the lead vehicle of train 2 and train 2 will be described as including cars 6-1-6-X. However, this is not to be construed in a limiting sense since train 2 can consist of locomotive 4 alone.

In one preferred non-limiting embodiment or example, locomotive 4 can include a head-end-unit (HEU) 8. HEU 8 can be coupled via a trainline 10 to an electronically controlled pneumatic (ECP) controller 14 in each car 6. Each ECP controller 14 can, in a manner known in the art, respond to electronic braking commands from HEU 8 for controlling the brakes of each car, also in a manner known in the art.

In one preferred non-limiting embodiment or example, mechanical couplers 16 can be utilized to couple proximate cars 6 to each other and to couple locomotive 4 to car 6-1 in a manner known in the art. Train 2 can include additional elements known in the art which are not shown in the figures for the purpose of simplicity. For example, it is understood that locomotive 4 includes a motor or engine that is utilized to provide motive force to train 2.

Figure 2:
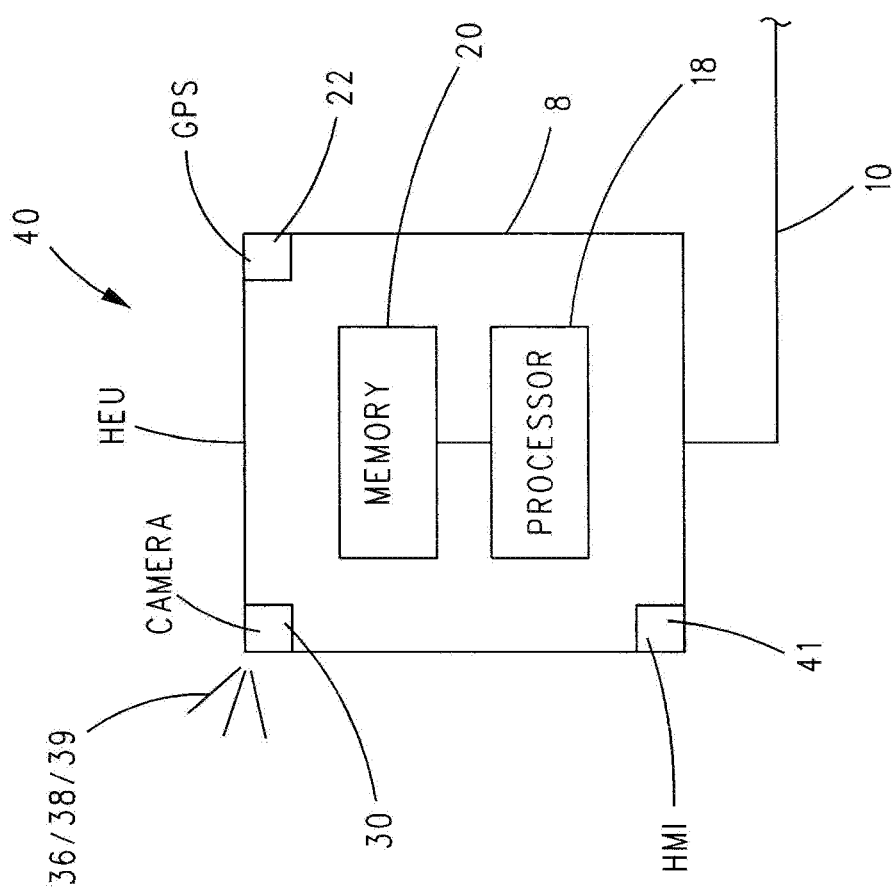
FIG. 2 is a schematic illustration of a controller, in accordance with the principles of the present invention, of the train shown in FIG. 1.

With reference to FIG. 2 and with continuing reference to FIG. 1, in one preferred non-limiting embodiment or example, trainline 10 acts in the nature of a communication network, such as, for example, without limitation, a local area network (LAN), between HEU 8 and at least each (ECP) controller 14.

In one preferred non-limiting embodiment or example, HEU 8 includes a processor 18 communicatively coupled to trainline 10 and a memory 20 coupled to processor 18 and operative for storing software control program(s), data, and/or database.

In one preferred non-limiting embodiment or example, processor 18 of HEU 8 coupled to memory 20 can comprise a controller 40. However, this is not to be construed in a limiting sense since it is envisioned that controller 40 can be comprised of one or more processors 18 and one or more memories 20.

In one preferred non-limiting embodiment or example, memory 20 can include dynamic, volatile memory, e.g., RAM, that loses program code and data stored therein when power to memory 20 is lost or when overwritten by the corresponding processor 18, and a non-volatile memory, e.g., ROM, flash memory and the like, the latter of which (non-volatile) memory, can store at least, an embedded operating system and embedded data for use by processor 18 in the presence or absence of power being applied to the non-volatile memory of said memory 20. In one preferred non-limiting embodiment or example, HEU 8 and memory 20 can receive electrical power for their operation via trainline 10 from a battery or generator of locomotive 4.

In one preferred non-limiting embodiment or example, HEU 8 can include or be coupled to a GPS receiver 22 disposed in locomotive 4. In one preferred non-limiting embodiment or example, trainline 10 can be a wired network, a wireless network, or a combination of both a wired and a wireless network.

In one preferred and non-limiting embodiment or example, HEU 8 can include or be coupled to a camera 30 disposed in locomotive 4. In an example, camera 30 can be a front-facing camera 30 that can take still pictures or videos in a direction opposite car 6-1. However, this is not to be construed in a limiting sense.

Figure 3A:
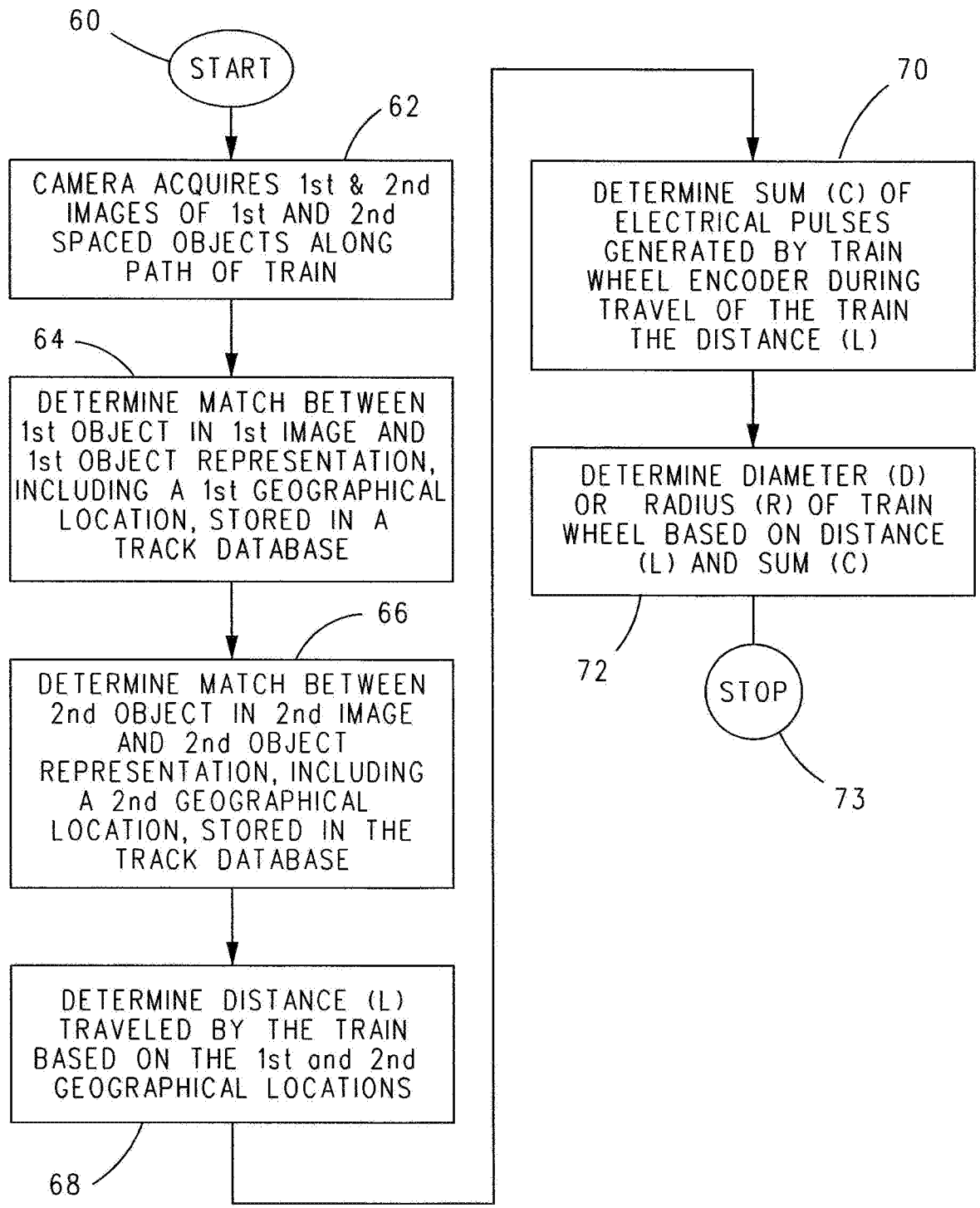
FIG. 3A is a flow diagram of a method in accordance with the principles of the present invention.

With reference to FIGS. 3A and 4A-4B and with continuing reference to FIGS. 1-2, in one preferred and non-limiting embodiment or example in accordance with the principles of the present invention, a method of determining a diameter or a radius a train wheel 28 can advance from a start step 60 to step 62 wherein, as train 2 travels along path 26, camera 30 positioned at the head of train 2 can, at a suitable times, acquire first and second images (or pictures) 36 and 38 of first and second objects 32 and 34 positioned at first and second locations 46 and 48 on or proximate path 26 of train 2. In an example, path 26 can be a train track comprised of one or more rails. However this is not to be construed in a liming sense. At the time of acquiring images 36 and 38, the geographical positions (longitudes and latitudes) of first and second locations 46 and 48 may be unknown.

In one preferred and non-limiting embodiment or example, for the purpose of description only, herein, the processing of first and second images 36 and 38 will be described as occurring after first and second images 36 and 38 have both been acquired in step 62. However, this is not to be construed in a limiting sense since it is envisioned that each image 36 and 38 can be processed in the manner described hereinafter at any time deemed suitable and/or desirable.

Referring to FIGS. 5A-5B and with continuing reference to FIGS. 1, 2, 3A, and 4A-4B, in one preferred and non-limiting embodiment or example, in step 64 controller 40, comprised of one or more processors 18 and one or more memories 20, can search a track database 50 for a match between first object 32 appearing in first image 36 and a corresponding object 54 appearing in an image 52 stored in track database 50. Each image 52 and/or object 54 stored in track database 50 can include or have associated therewith a geotagged geographical location 58 which can be actual geographical location (longitude and latitude) of the corresponding physical object on or proximate path 26.

In one preferred and non-limiting embodiment or example, track database 50 can be stored in a memory 20 of controller 40. Track database 50 can include a number of prerecorded images 52-1, 52-2, . . . 52-X. Each image 52 can include a representation (e.g., picture) of an object 54 corresponding to a physical object on or proximate path 26. Track database 50 can also include or have access to a distance database 56 that can include data from which controller 40 can determine a distance between one or more pairs of physical objects represented by objects 54 appearing in the prerecorded images 52 stored in track database 50. The data stored in distance database 56 enables the distance between one or more pairs of physical objects on or proximate path 26 to be determined for one or more lengths of path 26. In this manner, if path 26 has straight sections, curved sections, or both, the actual distance along path 26 between said pair of physical objects can be determined from the data stored in distance database 56.

In one preferred and non-limiting embodiment or example, suppose that camera 30 acquires a first image 36 of first object 32 (step 62). In step 64, controller 40 can compare first image 36 to images 52 in track database 50 until controller 40 finds a match between first object 32 appearing in first image 36 and an object 54 appearing in an image 52 of track database 50. In the example shown in FIG. 5A, first object 32 appearing in first image 36 corresponds or matches to object 54-2 appearing in image 52-2 stored in track database 50.

After camera acquires first image 36, train 2 continues traveling on path 26 (to the left in FIGS. 4A-4B) towards second object 34. As train 2 approaches second object 34, camera 30 acquires a second image 38 of second object 34 (step 62). In step 66, controller 40 can compare second image 38 to images 52 in track database 50 until controller 40 finds a match between second object 34 appearing in the second image 38 and an object 54 appearing in an image 52 of track database 50. In the example shown in FIG. 5B, second object 34 appearing in second image 38 corresponds or matches to object 54-X appearing in image 52-X stored in track database 50.

In one preferred and non-limiting embodiment or example, each image 52 stored in track database 50 can include or have associated therewith a geotagged geographical location 58 (longitude and latitude) for the object 54 appearing in the image 52. In an example, in response to controller 40 determining a match between first object 32 appearing in first image 36 and object 54-2 appearing in image 52-2 (FIG. 5A), controller 40 can associate, assign, or link the geotagged geographical location 58-2 of object 54-2 with first object 32. Similarly, upon determining a match between second object 34 appearing in second image 38 and object 54-X of image 52-X (FIG. 5B), controller 40 can associate, assign, or link the geotagged geographical location 58-X of object 54-X with second object 34.

At this time, as can be seen, based on matches between first and second objects 32 and 34 appearing in first and second images 36 and 38 acquired by camera 30 and corresponding objects 54-2 and 54-X appearing in images 52-2 and 52-X stored in track database 50, controller 40 can associate, assign, or link geotagged geographical locations 58-2 and 58-X to first and second objects 32 and 34. In this manner, geographical location 58-2 can be associated, assigned, or linked to first object 32 at location 46 and second geographical location 58-X can be associated, assigned, or linked second object 34 at location 48. In an example, geographical locations 58-2 and 58-X can correspond to locations 46 and 48 of the physical instances of first and second objects 32 and 34.

In an example, the geographical location 58 of each object 54 appearing in an image 52 included in track database 50 can be determined in any suitable and/or desirable manner, such as, without limitations, real-time kinematic (RTK) positioning, differential GPS, surveying, or any other suitable technique.

In one preferred and non-limiting embodiment or example, in step 68 controller 40 can determine a distance L traveled by train 2 along path 26 between geographical locations 58-2 and 58-X acquired from track database 50. In an example, distance L between first object 32 and second object 34 can be determined or acquired from distance database 56 for the distance L of path 26 between geographical locations 58-2 and 58-X (corresponding to actual physical locations 46 and 48) of first and second objects 32 and 34, regardless if path 26 is straight, curved, or both.

In one preferred and non-limiting embodiment or example, as can be understood, distance L (determined in the above manner) between first object 32 and second object 34 can be used as a proxy for the distance train 2 travels between the time camera 30 acquires first image 36 of first object 32 and the time camera 30 acquires second image 38 of second object 34.

In an example, a distance 55 between camera 30 and first object 32 when first image 36 is acquired and a distance 58 between camera 30 and second object 34 when second image 38 is acquired can be the same or different. Each distance 55 and 58 can be determined by controller 40 utilizing an image distance measurement technique known in the art that can determine from each acquired image of an object a distance from the camera lens to the object in the image.

In an example, where distances 55 and 58 are the same, the distance L between first object 32 and second object 34 acquired from distance database 56 can be used as a proxy for the distance that train 2 traveled between the acquisition of first image 36 and the acquisition of second image 38. However, in an example, where distances 55 and 58 are different, the distance L determined in step 68 can be adjusted by the difference between distances 55 and 58. In an example, suppose that distance 58 is greater than (or less than) distance 55 by a distance F. In this example, distance L determined in step 68 can be increased (or decreased) in step 68 by distance F in order to determine a corrected value of distance L to be used in steps 70 and 72 (discussed hereinafter) as a proxy for the distance train 2 traveled between the acquisition of first image 36 and second image 38.

In one preferred and non-limiting embodiment or example, where distances 55 and 58 are the same, the distance between first object 32 and second object 34 acquired from track database can be distance L. In an example, where distances 55 and 58 are different, the distance L determined in step 68 can be adjusted by (plus or minus as appropriate) the difference between distances 55 and 58.

In one preferred and non-limiting embodiment or example, in step 70 controller 40 can determine a sum C of electrical pulses generated by an encoder 42 coupled to train wheel 28 during travel of train 2 between the acquisitions by camera 30 of first and second images 36 and 38. In an example, controller 40 can count a total number of (sum) C of electrical pulses output by encoder 42 between the acquisition by camera 30 of first and second images 32 and 34. In an example, encoder 42 coupled to train wheel 28 is operative to generate X electrical pulses per revolution of train wheel 28. The use of an encoder 42 to output electrical pulses corresponding to whole or partial revolutions of train wheel 28 is well-known in the art and will not be described further herein.

In one preferred and non-limiting embodiment or example, in step 72 controller 40 can determine the diameter D or radius R of train wheel 28 based on the distance L, determined in step 68, and the sum C, determined in step 70, of electrical pulses generated by encoder 42 during travel of train 2 distance L.

In one preferred and non-limiting embodiment or example, the radius R of train wheel 28 can be determined using the formula $R=(L)(X)/2(\pi)(C)$. In one preferred and non-limiting embodiment or example, the diameter of train wheel 28 can be determined using the formula $D=(L)(X)/(C)(\pi)$. However, the use or one or both of these formulas is not to be construed in a limiting sense.

The method of FIG. 3A can then advance to stop step 73.

Figure 3B:
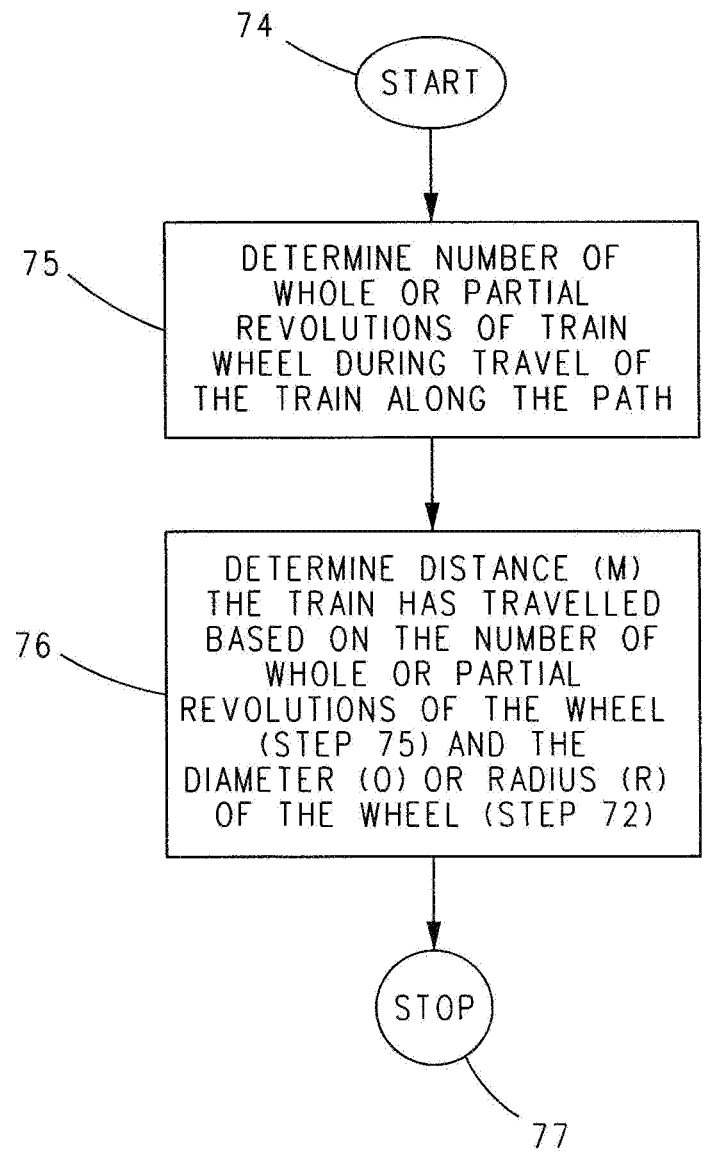
FIG. 3B is a flow diagram of a method in accordance with the principles of the present invention.

With reference to FIGS. 3B and 4C, and with continuing reference to FIG. 3A, in one preferred and non-limiting embodiment or example, the radius R or diameter D of train wheel 28 determined in step 72 can be used by controller 40 to determine a distance M traveled by train 2, as shown, in an example, by the method of FIG. 3B.

In an example, the method of FIG. 3B can advance from start step 74 to step 75 wherein controller 40 can determine a number of whole or partial revolutions of train wheel 28 during travel of the train along one or more sections of path 26. In an example, the number of whole or partial revolutions of train wheel 28 can be determined by controller 40 from a sum of electrical pulses generated by encoder 42 during travel between, for example, a section of path 26 that runs between second and third locations 48 and 53 (FIG. 4C).

In step 76, controller 40 can determine distance M train 2 has traveled between locations 48 and 53 based on the number of whole or partial revolutions of train wheel 28 determined in step 75 and the radius or diameter of the train wheel 28 determined in step 72. In an example, controller 40 may not need to know the geographical locations (longitudes and latitudes) of second and third locations 48 and 53 in order to determine distance M. Rather, via the radius or diameter of the train wheel 28 determined in step 72 and the electrical pulses output by encoder 42 during travel of train 2 between second and third locations 48 and 53, controller 40 can determine distance M without reference to GPS data or geographical locations 58 acquired from track database 50.

The method of FIG. 3B can then advance to stop step 77.

In one preferred and non-limiting embodiment or example, controller 40 can also determine an average velocity of the train 2 based on the distance M traveled by train 2 divided by a time for the train to travel said distance M.

Figure 3C:
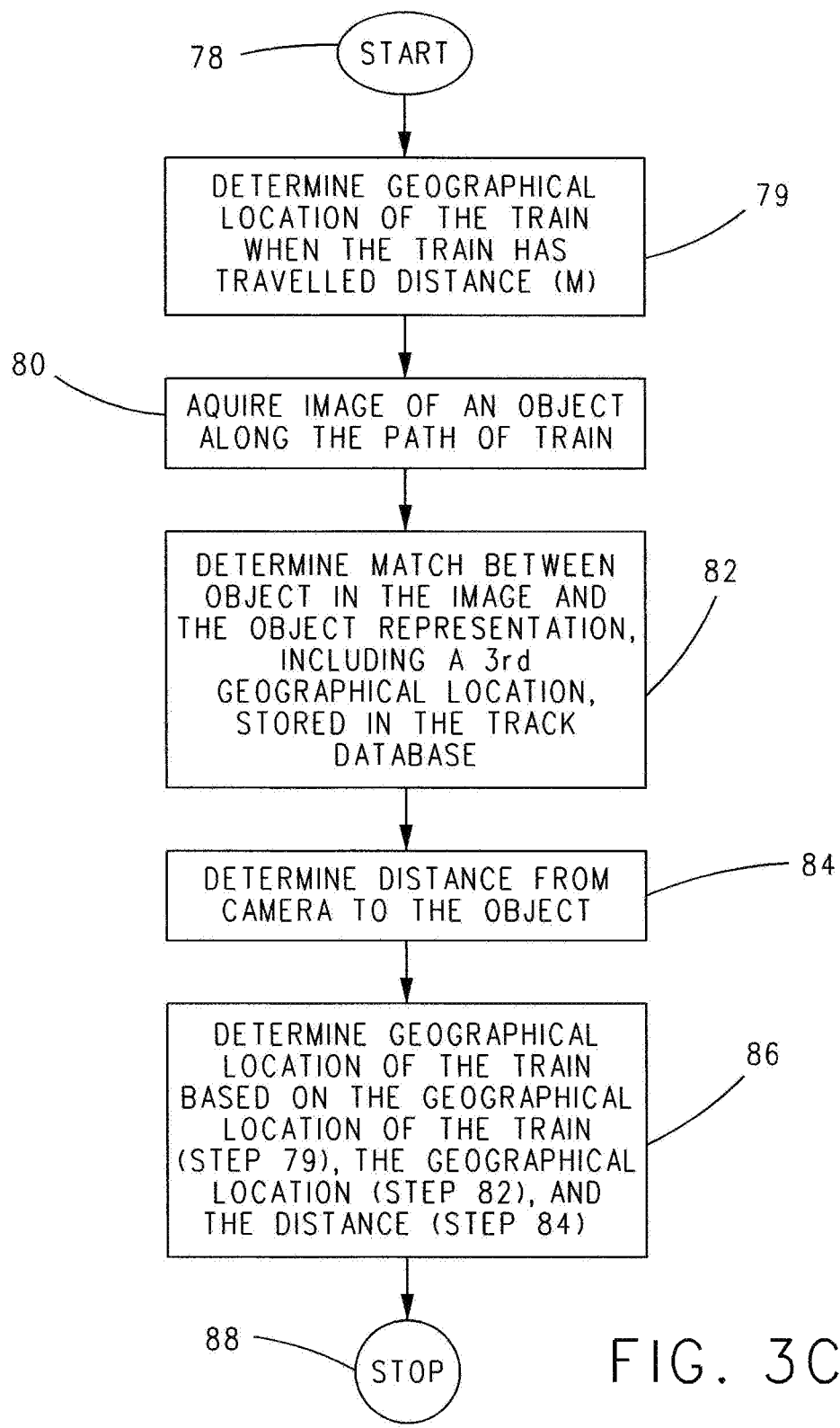
FIG. 3C is a flow diagram of a method in accordance with the principles of the present invention.

With reference to FIG. 3C and with continuing reference to FIGS. 3A and 4C, in one preferred and non-limiting embodiment or example, using the radius R or diameter D of train wheel 28 determined in step 72, controller 40 can determine a geographical location (longitude and latitude) of train 2 after traveling distance M along path 26.

In an example, the method of FIG. 3C can advance from start step 78 to step 79 wherein controller 40 can determine the geographical location of train 2 after traveling distance M along path 26. In an example, as shown in FIG. 4C, distance M can be, for example, the distance from second location 48 to location 44 proximate third location 53. In step 80, camera 30 can acquire a third image 39 of third object 37 on or proximate path 26 at third location 53.

In step 82, controller 40 can search track database 50 for a match between third object 37 appearing in third image 39 and an object 54 appearing in an image 52 of track database 50. In an example shown in FIG. 5C, third object 37 appearing in third image 39 corresponds or matches to object 54-1 appearing in image 52-1 of track database 50. In an example, image 52-1 can include or have associated therewith geotagged geographical location 58-1. Upon determining a match between third object 37 appearing in third image 39 and object 54-1 appearing in image 52-1 (FIG. 5C) controller 40 can associate, assign, or link geotagged geographical location 58-1 (longitude and latitude) with third object 37.

In step 84, controller 40 can determine a distance 59 from camera 30 to third object 37 the moment third image 39 is acquired. In an example, controller 30 can determine distance 59 utilizing the image distance measurement technique described above.

In step 86, controller 40 can determine or confirm that train 2 is at a geographical location 44 by comparing (1) the geographical location where train 2 should be located after traveling distance M to (2) the geographical location of train 2 determined from geographical location 58-1 associated, assigned, or linked to third object 37 adjusted by (minus) distance 59 determined by the image distance measurement technique described above.

The method can then advance to stop step 88.

In this manner, once controller 40 has determined the radius or diameter of train wheel 28, controller 40 can determine distance M traveled by train 2 on path 26 from a previously determined position, or fix (e.g., the geographical location 54-X (longitude and latitude) associated with location 48) based on the number of whole or partial revolutions of the train wheel 28 determined by counting the sum of electrical pulses generated by the encoder 42 during travel distance M and a heading of train 2 on the path 26.

In an example, the geographical location of the train determined in this manner can be compared to a geographical location of the train determined the manner described above from an image, e.g. third image 39, acquired by camera 30 of an object, e.g., third object 37 positioned at a location 53 (linked by controller 40 to geotagged geographical location 58-1 associated with object 54-1 of image 52-1 stored in track database 50) and a distance 59 between camera 30 and said object the moment camera 30 acquires the image of said object.

In one preferred and non-limiting embodiment or example, in step 79, the geographical location of train 2 after travelling distance M can be determined in any suitable and/or desirable manner. In an example, controller 40 can track the travel of train 2 along path 26 by way of a model of path 26, hosted by controller 40, that can include geographical locations (longitudes and latitudes) corresponding to physical locations along path 26. In an example, as train 2 travels in a particular heading on path 26, the distance train 2 travels on path 26 can be determined by controller 40 based on the electrical pulses output by encoder 42 in response to rotation of train wheel 28. Controller 40 can update the current geographical location (longitude and latitude) of train 2 via the model of path 26 based on the heading and distance train 2 travels, as determined from the electrical pulses output by encoder 42.

In an example, assume controller 40 determines that train 2, starting from a known first geographical location ($1^{st}$ longitude and latitude) acquired from the model of path 26, travels three meters heading east to a second geographical location ($2^{nd}$ longitude and latitude). In response to this movement, determined by controller 40 from the electrical pulses output by encoder 42 in response to rotation of train wheel 28, and knowing a heading of train 2 (i.e., east), controller 40 can update the geographical location of train 2 to the second geographical location. In an example, this second geographical location can be acquired from the model of path 26 hosted by controller 40. In another example, controller 40 can be programmed or configured to calculate the second geographical location based on the first geographical location and the movement of train 2 three meters heading east.

In one preferred and non-limiting embodiment or example, as can be seen, disclosed herein is a method, e.g., a computer-implemented method. In the method, controller 40 receives from camera 30 first and second images 36 and 38 of first and second objects 32 and 34 on or proximate path 26. First and second object 32 and 34 can be spaced along the length of path 26. In an example, controller 40 can determine a match between first object 32 appearing in first image 36 and a first object representation 54 included in track database 50. The first object representation 54 can include or have been associated therewith a first geographical location 58. In an example shown in FIG. 5A, first object 32 appearing in first image 36 is a match with object 54-2 appearing in image 52-2 of track database 50. Geotagged geographical location 58-2 can be associated with object 54-2 of image 52-2.

In an example, controller 40 can also determine a match between second object 34 appearing in second image 38 and a second object representation 54 included in track database 50. The second object representation 54 can include or can have associated therewith a second geographical location 58. FIG. 5B shows a match between second object 34 appearing in second image 38 acquired by camera 30 and object 54-X of image 52-X included in track database 50. Object 54-X of image 52-X can include or have associated therewith geotagged geographical location 58-X

In an example, controller 40 can determine the distance L traveled by train 2 along path 26 between at least the first and second geotagged geographical locations 58-2 and 58-X corresponding to locations 46 and 48 of first and second objects 32 and 34. In an example, controller 40 can also determine a sum C of electrical pulses generated by the encoder 42 during travel of the train distance L. As mentioned above, encoder 42 can be operative for generating X electrical pulses per revolution of train wheel 28. Finally, controller 40 can determine a diameter D or radius R of train wheel 28 based on distance L traveled by train 2 between geotagged geographical locations 58-2 and 58-X (corresponding to physical locations 46 and 48) and the sum C of electrical pulses generated by encoder 42 during travel of train 2 distance L.

Once controller has determined the radius or diameter of train wheel 28, controller 40 can determine a number of whole of partial revolutions of train wheel 28 during further travel of train 2 along path 26 based on a count of electrical pulses generated by encoder 42. In an example, controller 40 can determine a distance M train 2 has traveled along the path based on the thus determined number of whole or partial revolutions of train wheel 28 and the radius or diameter of the train wheel 28.

The first and second images 36 and 38 of the first and second objects 32 and 34 acquired by camera 30 on or proximate path 26 can be processed by controller 40 utilizing an image distance measurement technique to determine one or both of distance 55 between camera 30 and first object 32 the moment camera 30 acquires first image 36 and/or distance 58 between camera 30 and second object 34 the moment camera 30 acquires second image 38.

The distance L traveled by train 2 along path 26 between the first and second geographical locations 46 and 48 can be determined based on distance 56, distance 58, or both. In other words, the value of distance L can be adjusted by one or both of distances 56 and 58 to more accurately represent the actual distance L traveled by train 2 between first and second objects 32 and 34 at first and second geographical locations 46 and 48.

Although the invention has been described in detail for the purpose of illustration based on what is currently considered to be the most practical preferred and non-limiting embodiments, examples, or aspects, it is to be understood that such detail is solely for that purpose and that the invention is not limited to the disclosed preferred and non-limiting embodiments, examples, or aspects, but, on the contrary, is intended to cover modifications and equivalent arrangements that are within the spirit and scope of the appended claims. For example, it is to be understood that the present invention contemplates that, to the extent possible, one or more features of any preferred and non-limiting embodiment, example, or aspect can be combined with one or more features of any other preferred and non-limiting embodiment, example, or aspect

The invention claimed is:

1. A method comprising:
   acquiring, by at least one camera mounted on a vehicle, first and second images of first and second objects on or proximate a path being travelled by the vehicle, wherein the first and second objects are spaced along the path of the vehicle;
   determining, by a controller comprising one or more processors, a first match between the first object in the first image and a first object representation included in a vehicle database that includes a first geographical location;
   determining, by the controller, a second match between the second object in the second image and a second object representation included in the vehicle database that includes a second geographical location;
   determining, by the controller, a first distance travelled by the vehicle along the path between at least the first geographical location and the second geographical location based on obtaining the first distance from the vehicle database in response to determining the first match and determining the second match;
   determining, by the controller, a first sum of electrical pulses during travel of the vehicle over the first distance; and
   determining, by the controller, a diameter or a radius of the wheel based on the first distance and the first sum.

2. The method of claim 1, wherein each of the first geographical location and the second geographical location comprises a longitude and a latitude.

3. The method of claim 1, further including,
   determining, by the controller, a number of whole or partial revolutions of the wheel during travel of the vehicle along the path; and
   determining, by the controller, a second distance the vehicle has travelled along the path based on the number of whole or partial revolutions of the wheel and the radius or diameter of the wheel.

4. The method of claim 3, wherein, the number of whole or partial revolutions of the wheel is determined, by the controller, from a second sum of electrical pulses generated by an encoder during travel of the vehicle along the first distance.

5. The method of claim 3, further including determining, by the controller, a velocity of the vehicle based on the second distance divided by a time for the vehicle to travel the second distance.

6. The method of claim 1, further including:
determining, by the controller, a second distance the vehicle has travelled based on a count of a number of electrical pulses generated by an encoder during said travel.

7. The method of claim 6, further including determining, by the controller, a velocity of the vehicle based on the second distance divided by a time for the vehicle to travel the second distance.

8. The method of claim 1, further including:
determining, by the controller, a velocity of the vehicle based on a number of whole or partial revolutions of the wheel between the first geographical location and the second geographic location and a time for the vehicle to travel between said pair of geographical locations.

9. The method of claim 1, further comprising determining, by the controller, at least one of:
a third distance from the camera to the first object; or
a fourth distance from the camera to the second object.

10. The method of claim 9, wherein the first distance is determined based on least one of:
the third distance from the camera to the first object; or
the fourth distance from the camera to the second object.

11. The method of claim 1, further including determining, by the controller, a third distance from the camera to the first geographical location, and a fourth distance from the camera to the second geographical location, wherein, the first distance traveled by the vehicle is determined based on a difference between the third distance from the first camera to the first geographic location and the fourth distance from the second camera to the second geographic location.

12. The method of claim 1, further including,
determining, by the controller, the second geographical location of the vehicle when the vehicle has travelled the second distance along the path;
acquiring, by the camera, a third image of a third object on or proximate a path being travelled by the vehicle;
determining, by the controller, a match between the third object in the third image and a third object representation included in the vehicle database that includes the third geographical location;
determining, by the controller, a third distance from the camera to the third object; and
determining, by the controller, based on the second geographical location, and the third distance from the camera to the third object, a third geographical location of the vehicle.

13. The method of claim 12, further including providing to the controller access to a model of the path that includes the first geographical location, the second geographical location, the third geographical location, and the fourth geographical location corresponding to physical locations along the path, wherein the controller:
tracks via the model the physical locations along the path encountered by the vehicle determined from the whole or partial revolutions of the wheel during travel of the vehicle on the path.

14. The method of claim 1, wherein the camera is mounted on the vehicle and the vehicle is a lead vehicle of a multi-vehicle system.

15. The method of claim 1, wherein the camera is mounted on a locomotive as the vehicle.

16. A computer-implemented method comprising:
receiving, by a controller, comprising one or more processors, from by at least one camera mounted on a vehicle, first and second images of first and second objects on or proximate a path being travelled by the vehicle, wherein the first and second objects are spaced along the path of the vehicle;
determining, by the controller, a first match between the first object in the first image and a first object representation included in a vehicle database that includes a first geographical location;
determining, by the controller, a second match between the second object in the second image and a second object representation included in the vehicle database that includes a second geographical location;
determining, by the controller, a first distance travelled by the vehicle along the path between at least the first geographical location and the second geographical location based on obtaining the first distance from the vehicle database in response to determining the first match and determining the second match;
determining, by the controller, a sum of electrical pulses generated during travel of the vehicle the first distance; and
determining, by the controller, a diameter or a radius of the wheel based on the first distance and the sum.

17. The method of claim 16, further including:
determining, by the controller, a number of whole or partial revolutions of the wheel during travel of the vehicle along the path; and
determining, by the controller, a second distance the vehicle has travelled along the path based on the number of whole or partial revolutions of the wheel and the radius or diameter of the wheel.

18. The method of claim 16, further comprising, by the controller, at least one of:
a third distance from the camera to the first object; or
a fourth distance from the camera to the second object.

19. The method of claim 18, wherein, the first distance is determined based on least one of:
the third distance from the camera to the first object; or
the fourth distance from the camera to the second object.

20. A system comprising:
at least one camera configured to be mounted on a vehicle, the at least one camera configured to obtain a first image of a first object and a second image of a second object on or proximate a path being travelled by the vehicle, wherein the first and second objects are spaced along the path of the vehicle;
a controller coupled to the at least one camera and comprising one or more processors configured to:
obtain a first object representation and a second object representation from a vehicle database;
match the first object in the first image with the first object representation to determine a first geographical location;
match the second object in the second image with the second object representation to determine a second geographical location;
obtain a first distance travelled by the vehicle along the path between the first geographical location and second geographical location from a vehicle database in response to matching the first object in the first image and matching the second object in the second image;

obtain electrical pulses generated based on revolutions of a wheel of the vehicle; and determine a diameter or radius of the wheel based on the first distance and the electrical pulses.

* * * * *

UNITED STATES PATENT AND TRADEMARK OFFICE
CERTIFICATE OF CORRECTION

| | |
|---|---|
| PATENT NO. | : 11,332,172 B2 |
| APPLICATION NO. | : 16/155050 |
| DATED | : May 17, 2022 |
| INVENTOR(S) | : James A. Oswald |

It is certified that error appears in the above-identified patent and that said Letters Patent is hereby corrected as shown below:

In the Claims

In Claim 1 at Column 16, Lines 53-54, the portion reading "radius of the wheel" should read --radius of a wheel--.

In Claim 8 at Column 17, Line 22, the portion reading "between said pair of geographic locations" should read --between the first and second geographic locations--.

In Claim 11 at Column 17, Lines 36-38, the portion reading "third distance from the first camera to the first geographic location and the fourth distance from the second camera to the second geographic location" should read --third distance from the camera to the first geographic location and the fourth distance from the camera to the second geographic location--.

In Claim 12 at Column 17, Line 39, the portion reading "The method of claim 1" should read --The method of claim 3--.

In Claim 12 at Column 17, Lines 47-48, the portion reading "the vehicle database that includes the third geographical location" should read --the vehicle database that includes a third geographical location--.

In Claim 13 at Column 17, Lines 58-59, the portion reading "and the fourth geographical location corresponding to physical locations along the path" should read --and a fourth geographical location corresponding to physical locations along the path--.

In Claim 16 at Column 18, Lines 27-28, the portion reading "determining, by the controller, a diameter or a radius of the wheel based on the first distance and the sum" should read --determining, by the controller, a diameter or a radius of a wheel based on the first distance and the sum--.

Signed and Sealed this
Twenty-fifth Day of October, 2022

*Katherine Kelly Vidal*
Katherine Kelly Vidal
*Director of the United States Patent and Trademark Office*